(12) United States Patent
Cook

(10) Patent No.: US 6,206,556 B1
(45) Date of Patent: Mar. 27, 2001

(54) REMOTE HEADLAMP ADJUSTMENT SYSTEM

(75) Inventor: Rob A. Cook, Conrad, MT (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/493,876

(22) Filed: Jan. 28, 2000

(51) Int. Cl.[7] ................................................... F21V 21/14
(52) U.S. Cl. ........................... 362/529; 362/531; 362/485
(58) Field of Search .................................. 362/485, 529, 362/530, 532, 531, 273

(56) References Cited

U.S. PATENT DOCUMENTS 5,871,276 * 2/1999 Kowall et al. ..................... 362/529
5,906,431 * 5/1999 Chianale et al. ................. 362/529 X

* cited by examiner

Primary Examiner—Stephen Husar
(74) Attorney, Agent, or Firm—Sidley & Austin

(57) ABSTRACT

A remote headlamp adjustment system comprises a headlamp adjustment mechanism attached to a headlamp housing. The headlamp adjustment mechanism is adapted to adjust an aim of a headlamp relative to the headlamp housing. An adjustment screw protrudes from the adjustment mechanism to a terminal screw head. The screw is adapted to control a tilt movement for the aim of the headlamp. The screw has a screw axis along a longitudinal extent of the screw that the screw rotates about when the headlamp aim is being adjusted using the adjustment mechanism. A flexible shaft has first and second shaft ends. The first shaft end is rotatably connected to the screw head such that a rotation of the shaft actuates a rotation of the screw about the screw axis. The shaft has first and second shaft axes that portions of the shaft rotate about when the headlamp aim is being adjusted using the adjustment mechanism. The first shaft axis projects from the first end and substantially aligns with the screw axis. The second shaft axis projects from the second shaft end and the second shaft axis does not axially align with the first shaft axis. A clip protrudes from the headlamp housing. The second shaft end interlocks within the clip such that the clip retains a position of the second shaft end relative to the clip and relative to the adjustment mechanism, but the clip also allows the second shaft end to rotate within the clip about the second shaft axis.

10 Claims, 3 Drawing Sheets

REMOTE HEADLAMP ADJUSTMENT SYSTEM

TECHNICAL FIELD OF INVENTION

This present invention relates to a remote headlamp adjustment system for a vehicle. In one aspect, it relates to a remote headlamp adjustment system for adjusting the aim of a headlamp from the exterior of a vehicle. In another aspect, it relates to a headlamp assembly for a vehicle where the headlamp aim can be adjusted from the exterior of the vehicle via a hole formed in the headlamp assembly.

BACKGROUND OF INVENTION

Often the headlamp aim of a vehicle headlamp assembly must be adjusted when a headlamp is installed or replaced to ensure that the headlamp light beam provides the optimum night visibility for a given vehicle. Also, for safety reasons, it important to avoid directing the headlamp aim in a direction that may shine directly into the eyes of oncoming traffic. Hence, most headlamp assemblies incorporate a means of adjusting the headlamp aim relative to a given vehicle configuration. In the past, many headlamp assemblies were designed so that the entire headlamp assembly (lens, headlamp, and housing) could tilt for adjustment. However, many modern headlamps have a fixed outer headlamp lens because it is often desirable to have a headlamp assembly that is flush mounted and follows the contours of adjacent vehicle body panels to enhance aerodynamics or styling. In a headlamp assembly with a fixed outer lens, the headlamp typically can tilt within the housing relative to the fixed outer lens for headlamp aim adjustment.

Various adjustment mechanisms for adjusting headlamp aim are well known. Most adjustment mechanisms have an adjustment screw that engages with either the vehicle chassis or the headlamp assembly to push/pull the headlamp actuating a tilt in the headlamp relative to the vehicle chassis or relative to the headlamp assembly in a fixed lens assembly. In the past, the adjustment screw was typically turned by engaging the screw head with a tool directly. For example, many headlamp adjustment mechanisms found on passenger cars and pickup trucks have at least one adjustment screw that has a slot formed in the screw head adapted to receive a phillips-head screwdriver.

For many of the older style headlamp assemblies without a fixed lens, the headlamp aim can be adjusted from outside the vehicle by engaging an adjustment screw head with a screwdriver directly. Some vehicle configurations only provide access to the headlamp adjustment mechanism from within the engine bay, which often requires the hood to be open during adjustment. For the more modern style headlamp assemblies having a fixed outer lens, the headlamp adjustment typically must be accessed from within the engine bay area, from the backside of a body panel, or from underneath a vehicle body panel because the adjustment screw head faces the rear of the vehicle.

But for some applications, it is not feasible to adjust the headlamp aim with the headlamp assembly at its normal operating position while having the hood open. For example, on many heavy trucks the headlamp assembly is mounted to the hood, where the hood is one large integral piece incorporating the front fenders and grill, and the hood tilts forward in its open position about an axis in front of the engine. Thus in such vehicle configurations, the headlamp assembly tilts with the hood and the headlamps are aimed downward when the hood is open. To adjust the headlamp aim, it is typically desirable to have the headlamp aim directed generally horizontal with the headlamp assembly in the same position during adjustment as it would be during normal operation (i.e., with the hood closed). Hence, there is a need for a means of adjusting the headlamp aim for a headlamp assembly with a fixed outer headlamp lens from the exterior of the vehicle, without the need for having vehicle body panels open and without the need to crawl underneath the vehicle to access the adjustment mechanism.

SUMMARY OF INVENTION

Many of the needs outlined above are addressed by the present invention hereof. It is an object of the present invention to provide a remote headlamp adjustment system that provides a way to adjust the headlamp aim for a headlamp assembly with a fixed outer headlamp lens from the exterior of the vehicle, without the need for having vehicle body panels open and without the need to crawl underneath the vehicle to access the adjustment mechanism.

In accordance with one aspect of the present invention, a remote headlamp adjustment system is provided for a vehicle. The remote headlamp adjustment system comprises a headlamp adjustment mechanism attached to a headlamp housing. The headlamp adjustment mechanism is adapted to adjust an aim of a headlamp relative to the headlamp housing. An adjustment screw protrudes from the adjustment mechanism to a terminal screw head. The screw is adapted to control a tilt movement for the aim of the headlamp. The screw has a screw axis along a longitudinal extent of the screw that the screw rotates about when the headlamp aim is being adjusted using the adjustment mechanism. A flexible shaft has first and second shaft ends. The first shaft end is rotatably connected to the screw head such that a rotation of the shaft actuates a rotation of the screw about the screw axis. The shaft has first and second shaft axes that portions of the shaft rotate about when the headlamp aim is being adjusted using the adjustment mechanism. The first shaft axis projects from the first end and substantially aligns with the screw axis. The second shaft axis projects from the second shaft end and the second shaft axis does not axially align with the first shaft axis. A clip protrudes from the headlamp housing, and the second shaft end interlocks within the clip such that the clip retains a position of the second shaft end relative to the clip and relative to the adjustment mechanism. The clip allows the second shaft end to rotate within the clip about the second shaft axis. The second shaft end may be accessible through a hole formed in an exterior headlamp lens when the lens is attached to the headlamp housing and when the headlamp housing and lens are installed on a vehicle such that the headlight aim can be adjusted from the exterior of the vehicle. A slot adapted to receive a phillips-head or flat-head screwdriver tip may be formed in the second shaft end.

BRIEF DESCRIPTION OF DRAWINGS

Other objects and advantages of the invention will become apparent upon reading the following detailed description and upon reference to the accompanying drawings in which.

DETAILED DESCRIPTION OF INVENTION

Figure 1:
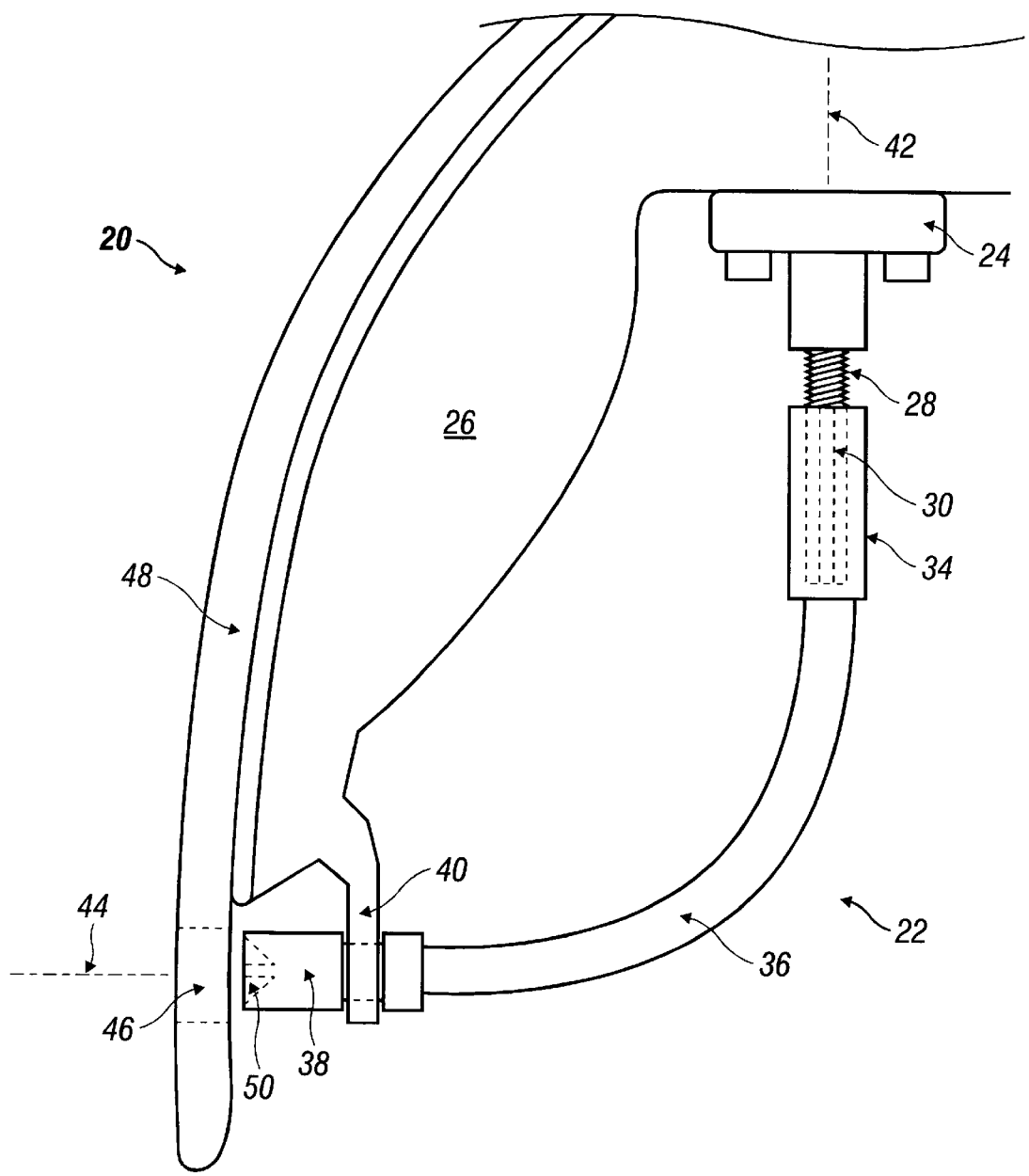
FIG. 1 is a top view of one embodiment of the present invention.

Referring now to the drawings, wherein like reference numbers are used to designate like elements throughout the various views of one embodiment of the present invention, that embodiment as well as other possible embodiments and modifications are further described.

FIG. 1 is a top view of a remote headlight adjustment system according to the present invention. A portion of a headlamp assembly 20 is shown to illustrate an remote headlamp adjustment system 22 that allows the headlamp aim to be adjusted from the exterior of a vehicle when installed on the vehicle. A headlamp adjustment mechanism 24 is attached to a headlamp housing 26 of the headlamp assembly 20. The adjustment mechanism 24 has an adjustment screw 28 protruding from it to a terminal screw head 30. Turning the adjustment screw 28 in one rotational direction will cause the screw to move inward relative to the adjustment mechanism 24 via the thread pattern formed on the screw. Similarly, turning screw 28 in the opposite direction will cause the screw to move outward relative to the adjustment mechanism 24. As the adjustment screw 28 moves inward or outward relative to the adjustment mechanism 24, it actuates a tilt movement of an attached headlamp 32, thereby providing adjustment of the headlamp aim. A first end 34 of a flexible shaft 36 has a socket formed in it that fits over and engages the screw head 30 so that the first shaft end 34 and the screw head are rotatably connected. When the shaft 36 is rotated, it actuates the rotation of the screw 28 via the screw head 30. The shaft 36 has a second end 38 that interlocks within a clip 40 that protrudes from the housing 26. The clip 40 retains the position of the second shaft end 38 relative to the housing 26 and relative to the adjustment mechanism 24, and the second shaft end can rotate within the clip.

The shaft 36 has first and second shaft axes 42, 44 that portions of the shaft rotate about when the remote headlamp adjustment system 22 is being used to adjust the headlamp aim. The first shaft axis 42 projects from the first shaft end 34 and is substantially aligned with a screw axis of the adjustment screw 28. The first shaft axis 42 is the axis that the first shaft end 34 rotates about when adjusting of the headlamp aim. Similarly, the screw axis is the axis that the adjustment screw 28 rotates about when adjusting of the headlamp aim. The second shaft axis 44 projects from the second shaft end 38, and it is the axis that the second shaft end rotates about during adjustment of the headlamp aim. It is an important aspect of the present invention that the second shaft axis 44 does not axially align with the first shaft axis 42 nor the screw axis. The angle between the first shaft axis 42 and the second shaft axis 44 can vary for any given application. The major advantage provided by the flexible shaft 36 is that the second shaft axis 44 need not be aligned with the first shaft axis 42, and thus the tool for engaging the second shaft end 38 need not be aligned with the screw axis during adjustment of the headlamp aim. Also, the tool can engage and actuate the second shaft end 38 at a location that is remote from the screw head 30.

Figure 2A:
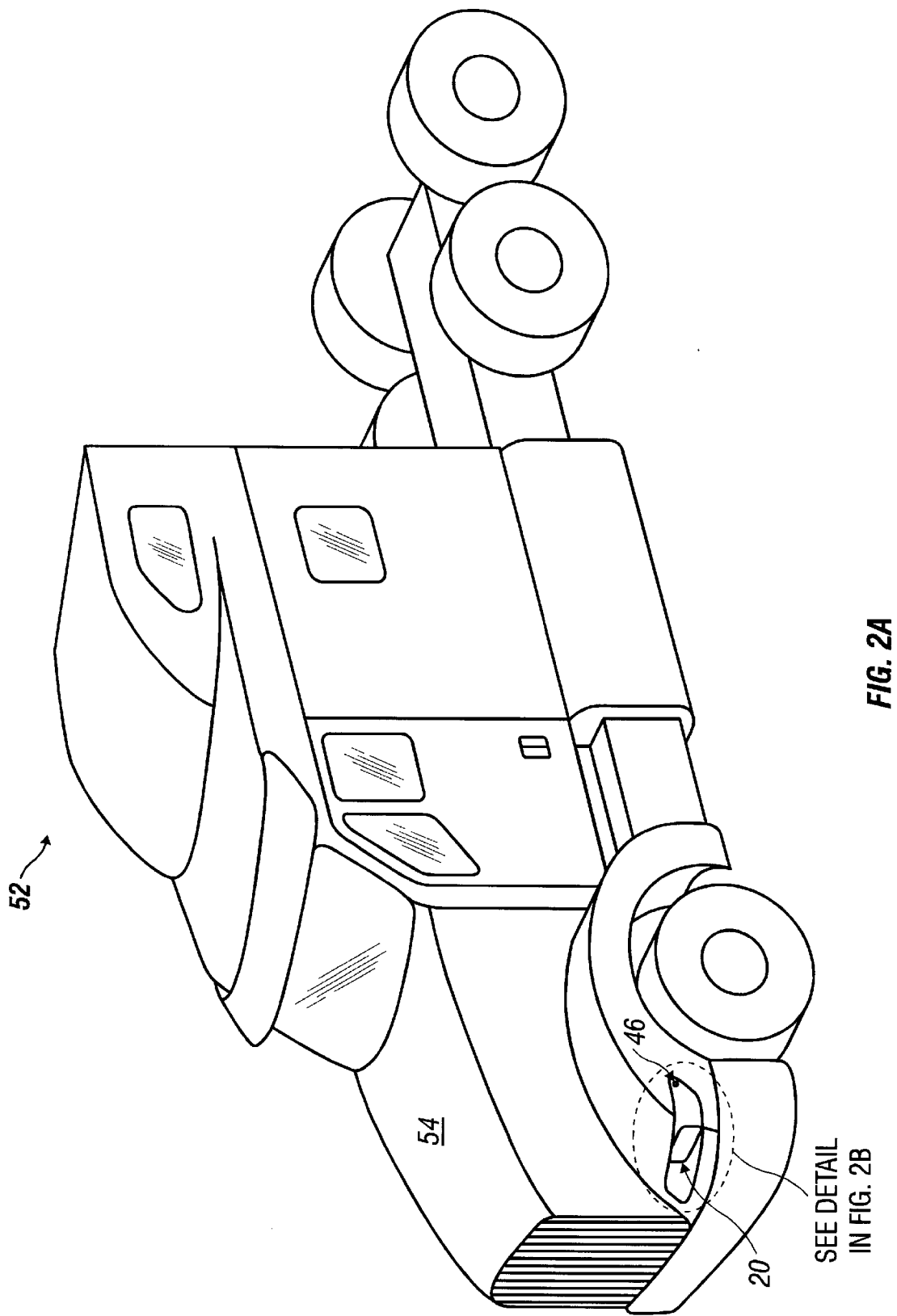
FIG. 2A is a perspective view of the invention installed on a truck.
Figure 2B:
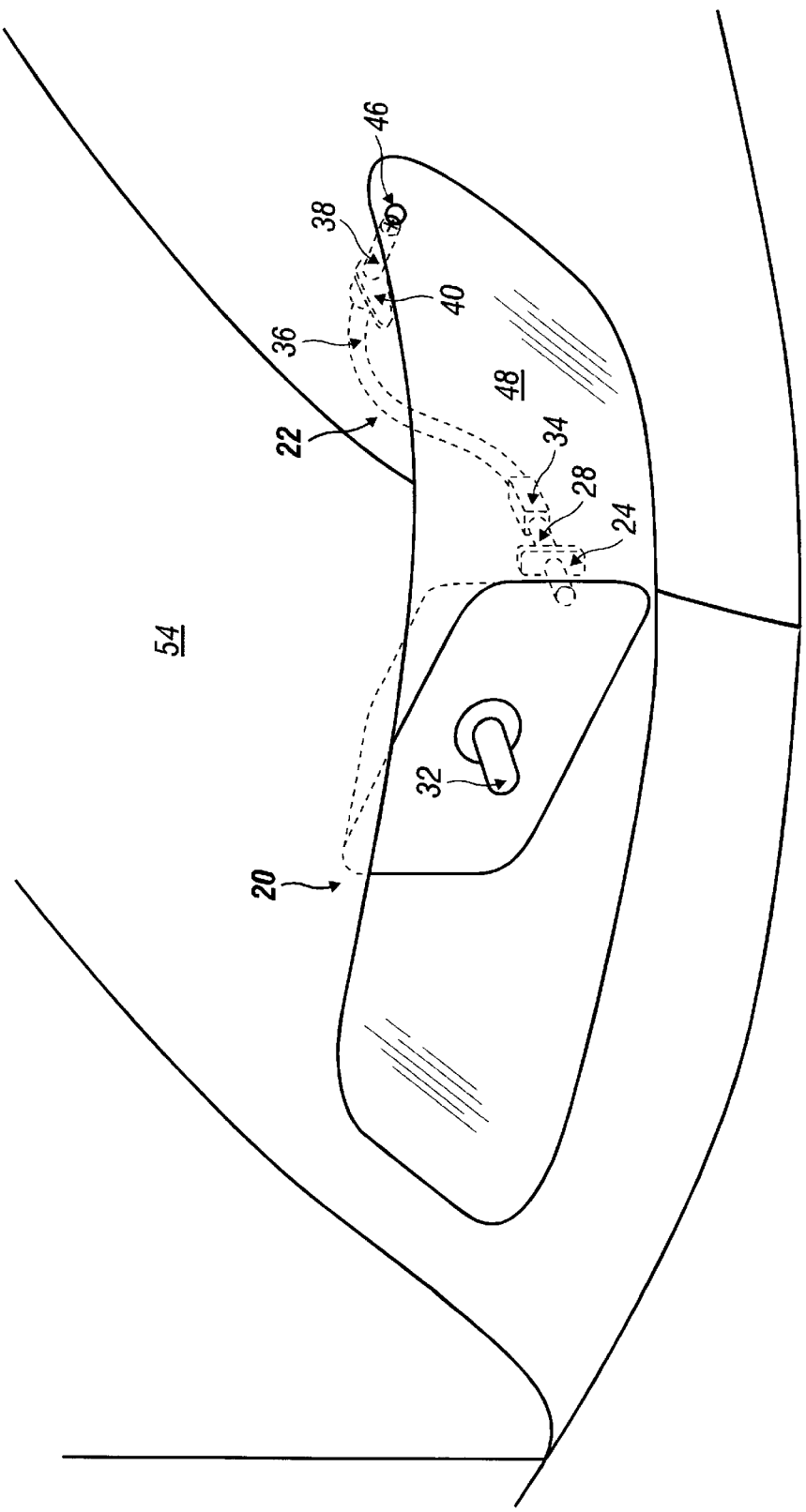
FIG. 2B is an enlarged view of the portion designated 2B of FIG. 2A.

FIG. 2A shows the first embodiment incorporated on a truck 52 having the headlamp assembly 20 of FIG. 1 installed thereon. FIG. 2B is an enlarged view of the headlamp assembly 20 shown in FIG. 2A to better illustrate the remote headlamp adjustment system 22 incorporated therein (as described and shown in FIG. 1). Referring to FIGS. 1–2B, a hole 46 is formed in a fixed outer headlamp lens 48, which is attached to the housing 26. The hole 46 provides access to the second shaft end 38 from the exterior of the vehicle when the headlamp assembly 20 is installed on the truck 52. A slot 50 is formed in the second shaft end 38 that is adapted to receive a phillips-head screwdriver tip. Thus, a phillips-head screwdriver (not shown) can be inserted through the hole to engage the second shaft end 38. When the screwdriver tip is inserted into the slot 50 of the second shaft end 38, rotation of the screwdriver will actuate substantially the same rotation in the shaft 36. The rotation of the shaft 36 actuates substantially the same rotation at the first shaft end 34. The rotation of the first shaft end 34 actuates substantially the same rotation in the adjustment screw 28. The rotation of the adjustment screw 28 then actuates the tilting of the attached headlamp 32 via the adjustment mechanism 24. Therefore, the adjustment screw 28 can be adjusted remotely via the flexible shaft 36 from the exterior of the truck 52 when the headlamp assembly 20 is installed on the truck.

The use of the first embodiment on the truck 52 shown in FIGS. 2A and 2B is particularly useful because the headlamp assembly 20 is attached to the hood 54 of the truck 52. The hood 54 on the truck 52 has the grill and fenders integrally attached to form one large body panel that tilts together when the hood is opened. Thus, when the hood 54 is opened, the headlamp assembly 20 will be facing the ground rather than facing forward. It is desirable to adjust the headlamp aim when the headlamp assembly 20 is in the same position as it would be during normal operation (i.e., with the hood 54 closed). The present invention allows this desirable adjustment configuration (i.e., adjustment with the hood 54 closed) because the headlamp aim can be adjusted, with the hood 54 closed, from the exterior of the truck 52 via the shaft 36 that is accessible through the hole 46 formed in the outer lens 48.

The components of the headlamp assembly 20 can be made from various materials, including but not limited to: polycarbonate, polyvinyl chloride, acrylic, glass, nylon, plastic, rubber, silicon, thermoplastic polymers, steel, aluminum, titanium, fiber-glass composites, carbon-fiber composites, carbon-fiber composites, or any combination thereof. The flexible shaft 36 can be a solid shaft made from any pliable structural polymer, including but not limited to: polyethylene thermoplastics, polypropylene thermoplastics, polyvinyl chloride (PVC) thermoplastics, polystyrene thermoplastics, branched polyethylene (LDPE), or acrylonitrile-butadiene-styrene (ABS). Also, the flexible shaft 36 can be formed by coiled metal wire. The flexible shaft 36 also can be a single piece of material (e.g., thermoplastic polymer), or it can be multiple pieces attached together to form the essential shaft components (e.g., a rigid piece connected to each end of a flexible shaft).

Other embodiments of the present invention may have variations from the first embodiment described above herein. For example, there may be a second clip (not shown) protruding from the housing 26 to retain the first shaft end position relative to the adjustment mechanism 24. The clip 40 and/or the second clip may be attached to the vehicle chassis or a body panel rather than protruding from the housing 26. There may be variations of the adjustment mechanism 24 as to how it engages and tilts the headlamp 32, which are known in the prior art. The slot 50 formed in the second shaft end 38 can be replaced with any of a variety of forms of the second shaft end adapted for receiving various tools, including but not limited to a: torx bit, allen wrench, open-end wrench, closed-end wrench, key, or socket. Also, to accommodate these variations in the second shaft end 38, the second shaft end may protrude through the hole 46 in the lens 48 and terminate outside of the lens and housing 26. The flexible shaft 36 can be replaced by a segmented shaft (not shown), where each segment is connected by a universal joint or by a set of gears, to provide an embodiment where the second shaft axis 44 is not aligned with the first shaft axis 42 and the second shaft end 38 is accessible from the exterior of the vehicle. There may or may not be a hole 46 formed in the outer headlamp lens 48 for providing access to the second shaft end 38. In an embodiment where there is no hole 48 in the lens 48 for providing access to the second shaft end 38, there may be a hole (not shown) in a vehicle body panel or a space between two body panels where the second shaft end 38 can be accessed from the exterior of the truck 52.

It will be appreciated by those skilled in the art having the benefit of this disclosure that this invention provides a remote headlamp adjustment system for adjusting a headlamp aim from the exterior of a vehicle. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

The claimed invention is:

1. A remote headlamp adjustment system, comprising:
   a headlamp adjustment mechanism attached to a headlamp housing, said headlamp adjustment mechanism being adapted to adjust an aim of a headlamp relative to said headlamp housing;
   an adjustment screw protruding from said adjustment mechanism to a terminal screw head, said screw being adapted to control a tilt movement for said aim of said headlamp, and said screw having a screw axis along a longitudinal extent of said screw that said screw rotates about when said headlamp aim is being adjusted using said adjustment mechanism;
   a flexible shaft having first and second shaft ends, said first shaft end being rotatably connected to said screw head such that a rotation of said shaft actuates a rotation of said screw about said screw axis, said shaft having first and second shaft axes that portions of said shaft rotate about when said headlamp aim is being adjusted using said adjustment mechanism, said first shaft axis projects from said first end and substantially aligns with said screw axis, said second shaft axis projects from said second shaft end and said second shaft axis does not axially align with said first shaft axis; and
   a clip protrudes from said headlamp housing, said second shaft end interlocks within said clip such that said clip retains a position of said second shaft end relative to said clip and relative to said adjustment mechanism, and said clip allows said second shaft end to rotate within said clip about said second shaft axis.

2. A remote headlamp adjustment system in accordance with claim 1, wherein said second shaft end is accessible through a hole formed in an exterior headlamp lens when said lens is attached to said headlamp housing and when said headlamp housing and lens are installed on a vehicle such that said headlight aim can be adjusted from the exterior of said vehicle.

3. A remote headlamp adjustment system in accordance with claim 1, further comprising a slot formed in said second shaft end, said slot being adapted to receive a phillips-head screwdriver tip.

4. A remote headlamp adjustment system in accordance with claim 1, further comprising a slot formed in said second shaft end, said slot being adapted to receive a flat-head screwdriver tip.

5. A headlamp assembly for a vehicle, comprising:
   a headlamp attached to a headlamp housing;
   a headlamp lens attached to said housing and covering said headlamp;
   a headlamp adjustment mechanism attached to said headlamp housing, said headlamp adjustment mechanism being adapted to adjust an aim of said headlamp relative to said headlamp housing;
   an adjustment screw protruding from said adjustment mechanism to a terminal screw head, said screw being adapted to control a tilt movement for said aim of said headlamp, and said screw having a screw axis along a longitudinal extent of said screw that said screw rotates about when said headlamp aim is being adjusted using said adjustment mechanism;
   a flexible shaft having first and second shaft ends, said first shaft end being rotatably connected to said screw head such that a rotation of said shaft actuates a rotation of said screw about said screw axis, said shaft having first and second shaft axes that portions of said shaft rotate about when said headlamp aim is being adjusted using said adjustment mechanism, said first shaft axis projects from said first end and substantially aligns with said screw axis, said second shaft axis projects from said second shaft end and said second shaft axis does not axially align with said first shaft axis; and
   a clip formed in said headlamp housing, said second shaft end interlocks within said clip such that said clip retains a position of said second shaft end relative to said clip and relative to said adjustment mechanism, and said clip allows said second shaft end to rotate within said clip about said second shaft axis;
   a hole formed in said lens adapted to provide access to said second shaft end from the exterior of said vehicle when said headlamp assembly is installed on said vehicle such that said headlight aim can be adjusted from the exterior of said vehicle.

6. A headlamp assembly in accordance with claim 5, further comprising a slot formed in said second shaft end, said slot being adapted to receive a phillips-head screwdriver tip.

7. A headlamp assembly in accordance with claim 5, further comprising a slot formed in said second shaft end, said slot being adapted to receive a flat-head screwdriver tip.

8. A headlamp assembly for a vehicle, comprising:
   a headlamp attached to a headlamp housing;
   a fixed outer headlamp lens attached to said housing and covering said headlamp;
   a headlamp adjustment mechanism attached to said headlamp housing, said headlamp adjustment mechanism being adapted to adjust an aim of said headlamp relative to said headlamp housing;
   an adjustment screw protruding from said adjustment mechanism to a terminal screw head, said screw being adapted to control a tilt movement for said aim of said headlamp, and said screw having a screw axis along a longitudinal extent of said screw that said screw rotates about when said headlamp aim is being adjusted using said adjustment mechanism;
   a flexible shaft having first and second shaft ends, said first shaft end being rotatably connected to said screw head such that a rotation of said shaft actuates a rotation of said screw about said screw axis, said shaft having a first and second shaft axis that portions of said shaft rotate about when said headlamp aim is being adjusted using said adjustment mechanism, said first shaft axis projects from said first end and substantially aligns with said screw axis, said second shaft axis projects from said second shaft end and said second shaft axis does not axially align with said first shaft axis; and a clip formed in said headlamp housing, said second shaft end interlocks within said clip such that said clip retains a position of said second shaft end relative to said clip and relative to said adjustment mechanism, and said clip allows said second shaft end to rotate within said clip about said second shaft axis;

a hole formed in said lens adapted to provide access to said second shaft end from the exterior of said vehicle when said headlamp assembly is installed on said vehicle such that said headlight aim can be adjusted from the exterior of said vehicle.

9. A headlamp assembly in accordance with claim 8, further comprising a slot formed in said second shaft end, said slot being adapted to receive a phillips-head screwdriver tip.

10. A headlamp assembly in accordance with claim 8, further comprising a slot formed in said second shaft end, said slot being adapted to receive a flat-head screwdriver tip.

* * * * *